INVENTOR.
H. J. Schmick
BY
ATTORNEY.

UNITED STATES PATENT OFFICE.

HENRY J. SCHMICK, OF WILLIAMSPORT, PENNSYLVANIA, ASSIGNOR TO SCHMICK SCREW AND GEAR COMPANY, OF WILMINGTON, DELAWARE, A CORPORATION OF DELAWARE.

GEAR-MAKING MACHINE.

1,385,097.          Specification of Letters Patent.      Patented July 19, 1921.

Application filed December 10, 1918. Serial No. 266,139.

*To all whom it may concern:*

Be it known that I, HENRY J. SCHMICK, citizen of the United States of America, residing at Williamsport, in the county of Lycoming and State of Pennsylvania, have invented certain new and useful Improvements in Gear-Making Machines, of which the following is a specification.

This invention relates to new and improved methods and means for producing helical working surfaces or elements on the periphery of a gear, cam, segmental lever arm or analogous agency of mechanics.

In cutting gears and other toothed members as now practised, the distance between the cutting tools, and the rotary movement of the blank are so timed that when one tool about leaves the cut space in the blank, another tool will be in generating position on the opposite face of the blank, the latter having moved in the interval a distance sufficient to generate the next succeeding element.

According to my present invention the cutting tools are positioned to move in a straight line across the periphery of the blank, and may conveniently be spaced apart twice the width of the periphery, in which case their movement is so timed with reference to the movement of the blank that each cutting tool cuts a space entirely across the width of the periphery, while the blank moves half the distance between adjacent elements. In the continued movement of the blank, the latter moves the other half distance between the elements with the first mentioned cutting tool entirely free, while the succeeding cutting tool reaches a generating position to cut the next succeeding space on the blank. A further object of this invention is to provide mechanism wherein successive cutting tools, during the cutting period, move across the periphery of a blank in a straight line parallel with the periphery of the blank, and associated therewith, means to continually rotate the blank so that its periphery will move approximately at right angles to the movement of the cutting tools.

A still further object of the invention is to provide a new method of cutting helical elements, in that in lieu of causing a cutting tool to move in angular relation to the axis of a blank to generate the elements, I propose to move a cutting tool the full width of a blank in a straight line parallel with the axis of said blank, and rotate the blank during the cutting operation, the tools being so disposed that when one about finishes its cutting action, another is being brought into position to generate the next proposed element.

Another object of this invention is to provide mechanism wherein a cutting tool when in cutting position is caused to travel in a straight line at right angle to the axis of its rotating head or support, while the blank upon which it is operating is mounted on a shaft which is disposed parallel with the path of movement of the cutting tool and is continuously rotated.

The invention also comprehends improvements in the details of construction and arrangement of parts which will be hereinafter described and particularly pointed out in the claims.

In the accompanying drawings:—

In illustrating the application of this invention, I have used mechanism of a recognized type having a rotating cutter head and a rotating work support. I will therefore but briefly describe sufficient of the structure to enable one skilled in the art to comprehend the present improvement, although it is to be understood that any appropriate means may be employed to accomplish the desired result as will later appear.

The mechanism comprises a frame 1, provided with a vertically adjustable table 2. On the frame is mounted a drive shaft 3, geared by means of timing gears 4, to a transverse countershaft 5. A shaft 6 is mounted on the table, and connected by a universally mounted shaft 7, to a stub shaft on which is a drive pulley 8. The shaft 6, is provided with a jaw clutch 9, which through appropriate gearing 10, 10ª, and the lead screw 10ᵇ, causes the movement of a platform 11, mounted on the table 2. The platform is provided with an adjustable trip arm 9ª which may be set to engage the clutch 9 and disconnect it at any desired point of travel of the platform.

On one end of the drive shaft 3, is secured a head 13, which rotates between bearing plates 14—14, provided with bearings to receive the shaft. The tool head is formed with a plurality of radial slots 15, which receive tool holder supports 16. Each of these supports comprises a square body 17, and circular end flanges 18, and a central bearing 19.

The plates 14, are each formed with a guideway 20 in which ride the end flanges 18, of the supports. Each guideway 20 on the end plate 14, is in the main, annular, but its upper portion is horizontal, as indicated at 21, and parallel with the horizontal portion of one such guideway 20 are protruding flanges 22, which form another guideway 23.

Mounted in the supports 16 are tool holders 24, each of which comprises a square socket 25, and stem 26, and a retaining nut 27.

Figure 1:
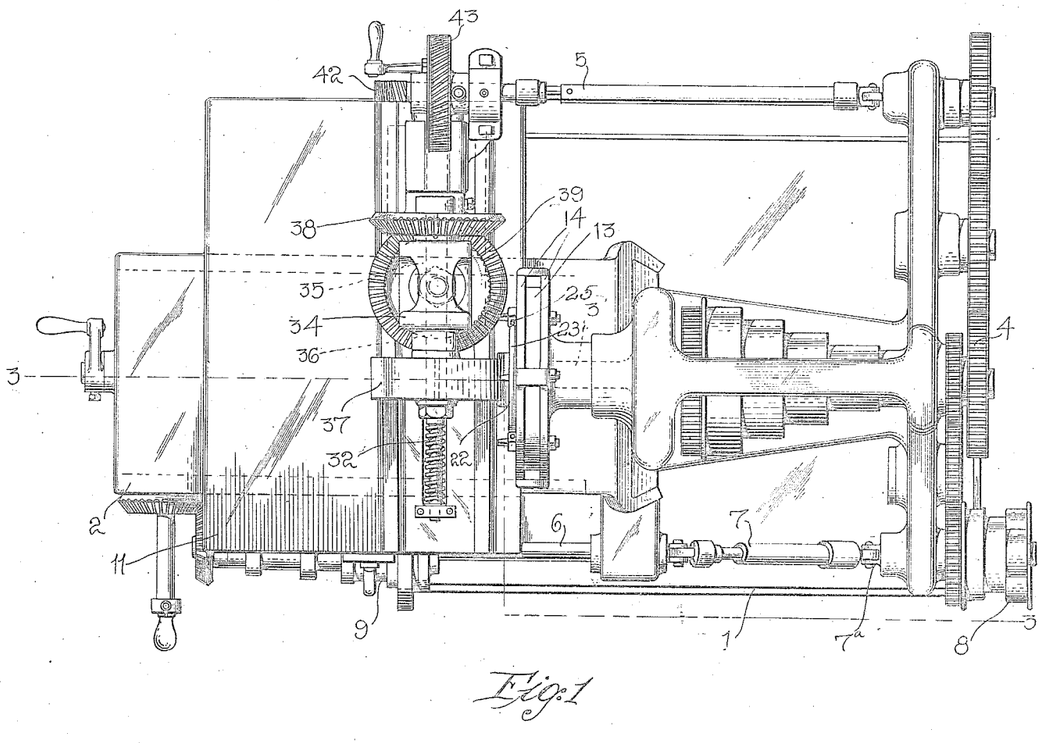
Figure 1 is a plan view of a machine embodying my invention.
Figure 2:
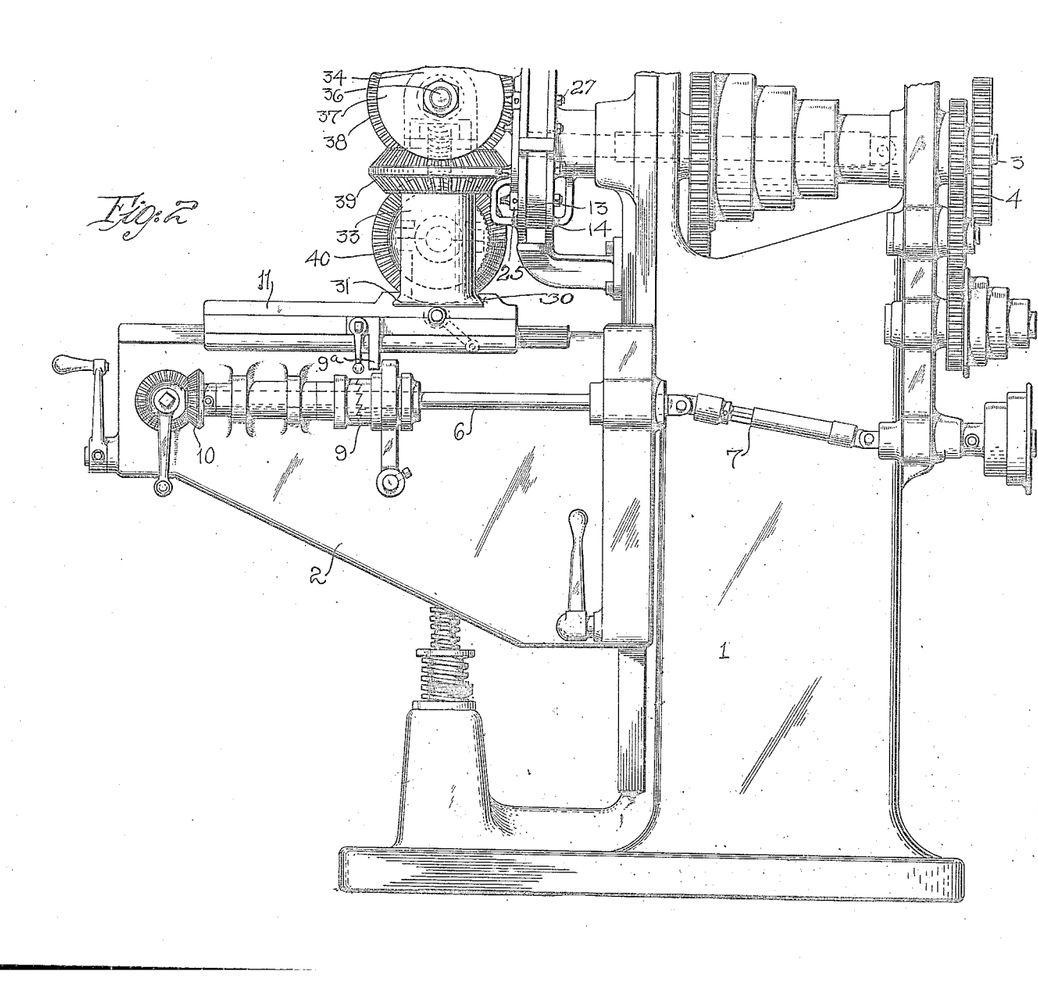
Fig. 2 is a side elevation of same.
Figure 3:
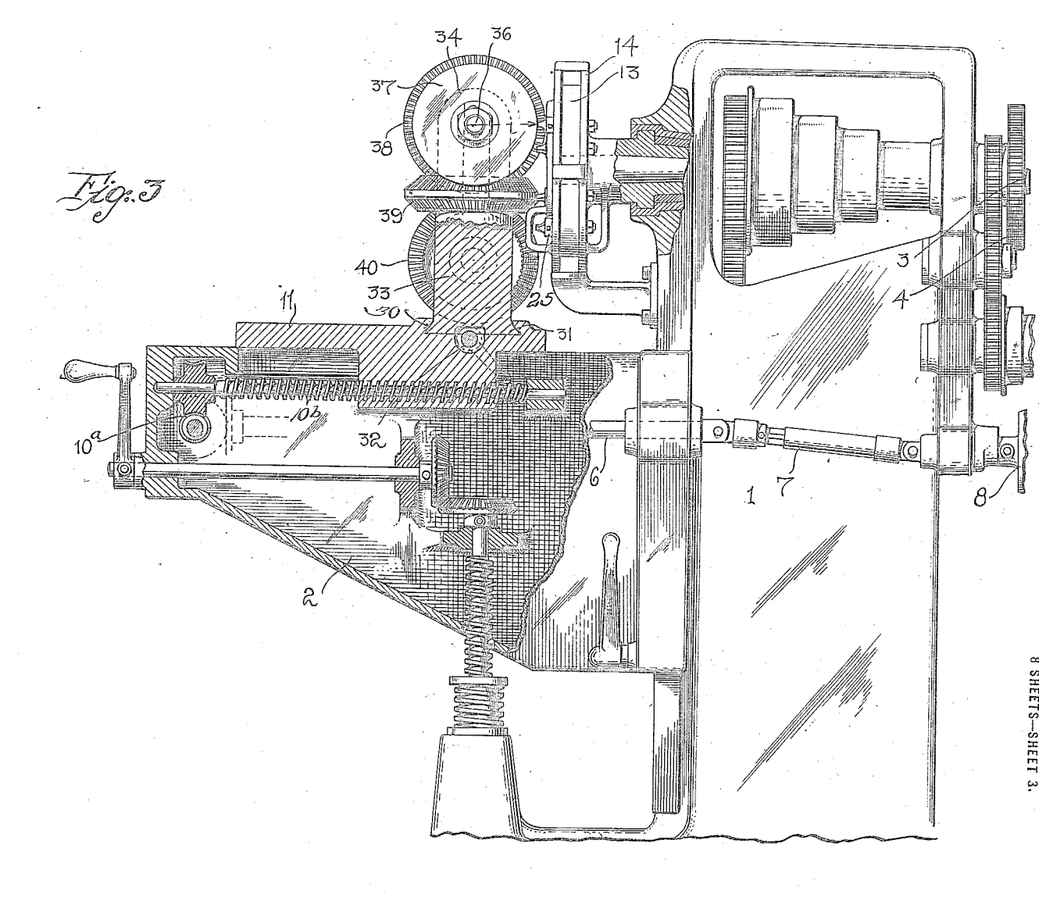
Fig. 3 is a section on the line 3—3 of Fig. 1.
Figure 4:
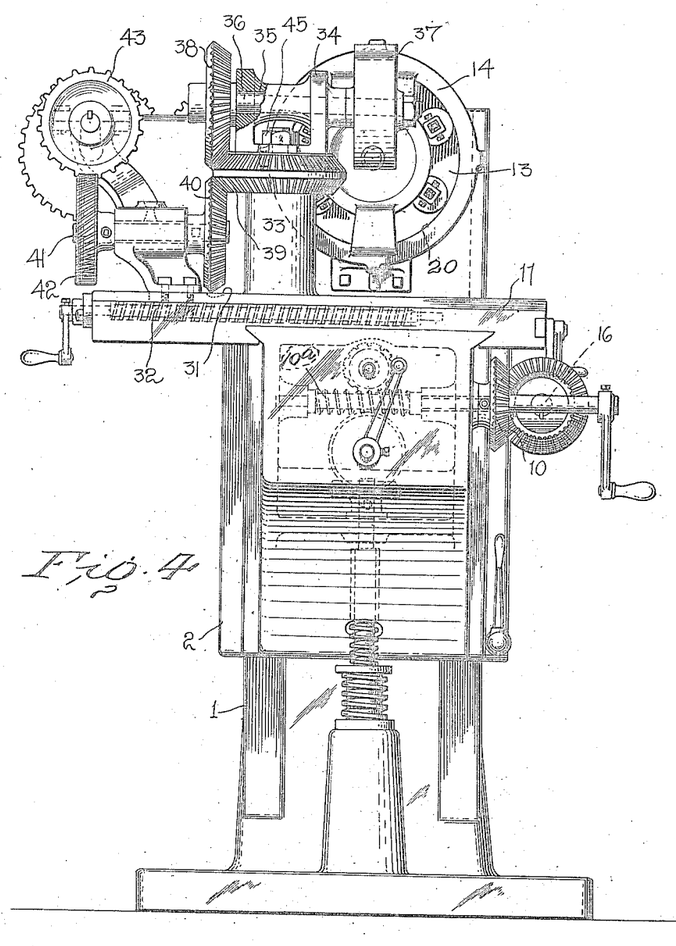
Fig. 4 is an end elevation.
Figures 5, 6, 7:
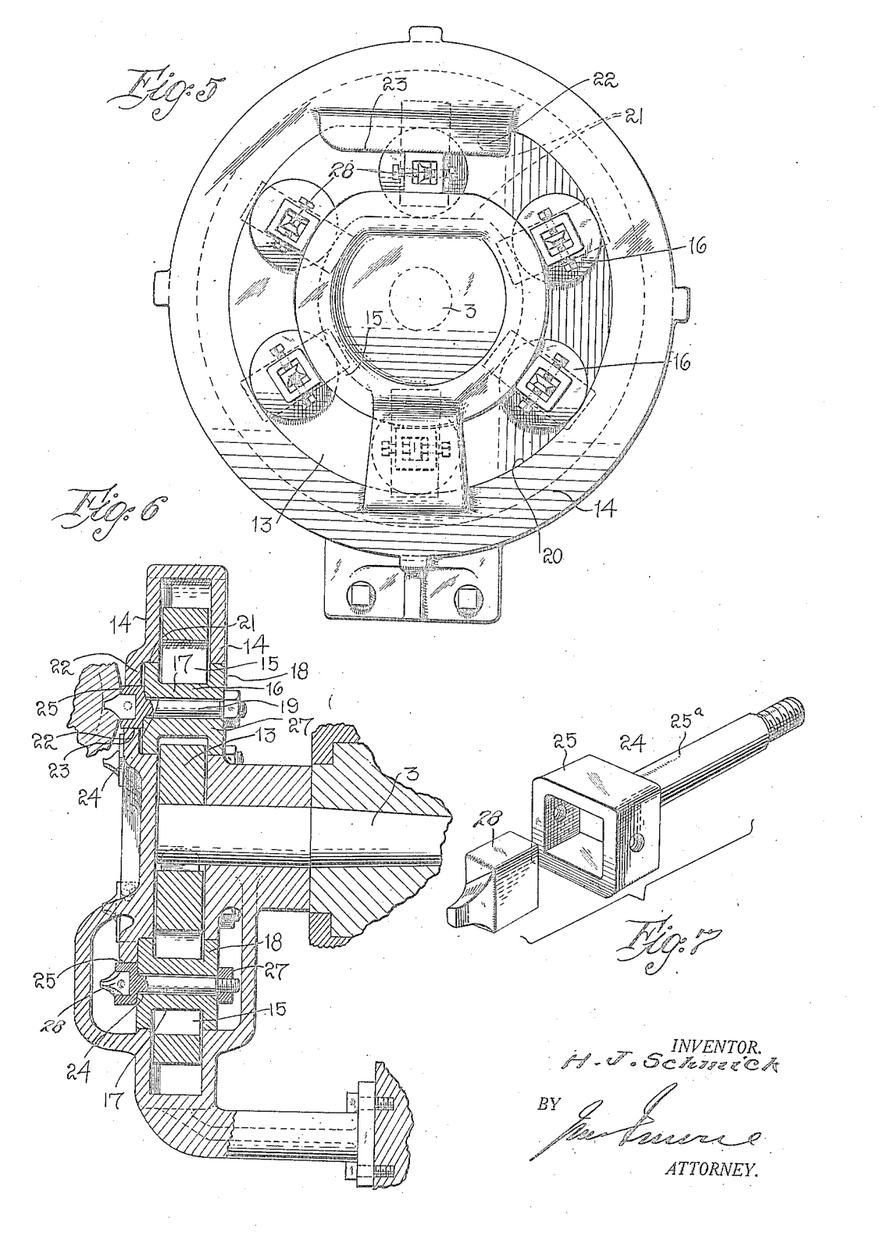
Fig. 5 is a face view of the cutter head; and its supporting frame.
Fig. 6 is a central vertical section of the same.
Fig. 7 is a detail perspective view of one of the cutting tool holders.

The square portions 17 of the tool holder supports are slidably mounted in the slots 15, while the flanged ends 18, travel in the guideways in the plates 14. The stems 26 of the tool holders engage in the bearings 19, in the supports, and the square sockets 25, are arranged to pass through the guideway 23, as best shown in Fig. 6. Tools 28 are secured in the sockets 25 and project outwardly therefrom parallel with the axis of the tool head, the tools being shaped to correspond to the shape of the cam elements, to be generated. The holders and the tools supported thereby are grouped around the axis of the tool head and travel in the path defined by the guideway 20.

As the tool head rotates, it carries with it, the tool holders and the tools. The major portion of the movement of the tools is in a fixed circular path but when the square sockets 25, reach the horizontal guideway 23, the tool holders, consequently the tools are partially rotated in their supports 16, and are thereafter retained in a fixed relative position while in transit through said guideway. As the tool holders approach or recede from the vertical center line of the tool head, and while in transit through the horizontal guideway, there is a relative sliding radial movement between the square portions 17, of the tool holder supports, and the tool head and simultaneously therewith the supports turn on the stems 25, of the tool holder. In other words, the tool head rotates and carries with it the cutting tools, but by the construction described the tools are caused to travel in a straight line at right angle to the axis of the head for a portion of each revolution. The straight line movement of the tools extends across the vertical center line of the tool head, for a purpose which will presently appear.

The platform 11, engages gibs on the table and is continuously moved toward the tool head by the gearing 10, such movement being controlled by the clutch 9, and a trip 9ª, which throws out the clutch when the platform reaches the limit of its movement toward the tool head. In the top of the platform 11, is a guideway 30, and mounted therein is a slide 31, operated by a screw 32. On the slide is a vertical standard 33, on the upper end of which is adjustably mounted a head 34, provided with a bearing 35, and mounted therein is a horizontal shaft 36. On one end of the shaft 36, is supported a blank 37, while on the opposite end is a beveled pinion 38. The beveled pinion 38, meshes with a double face beveled gear wheel 39, loosely mounted between the standard 33, and the head 34. Meshing with the lower beveled teeth of the gear wheel 39, is a beveled pinion 40, of exactly the same diameter as the beveled pinion 38, and mounted on a shaft 41, supported in bearing on the slide 31. On the outer end of the shaft 41, is a worm gear wheel 42, and meshing therewith is a worm gear wheel 43, connected to the universally mounted counter shaft 5.

By this train of gearing, motion is imparted from the countershaft to the blank, the loosely mounted double face beveled gear wheel permitting of the rotary adjustment of the axis of a blank with reference to the cutting tools, to cut cam elements of the spur or bevel type. This adjustment is accomplished by releasing the nut 45, and turning the head 34, the pinion 38, rolling around in engagement with the upper teeth on the doubled beveled gear 39. This adjustment is to set the blank to the degree or angle at which the elements are to be generated. The shaft 36, is parallel with the straight line movement of the cutting tools, when generating cam elements to produce a spur gear, consequently the blank 37, is disposed at right angle to the tool head. If however cam elements are to be generated to produce a beveled gear, then of course the shaft 36, will be disposed at an angle to the straight line movement of the cutting tools, although the peripheral surface being operated on will momentarily be parallel to the straight line movement of said tools. In either case, the straight line movement of the tools is in the same plane as the axis of the shaft and the center of the blank.

The slide 31, can be adjusted to accommodate blanks of various widths, while the adjustable table affords convenient means for vertical adjustment for blanks of various diameter.

Let it be assumed that a blank be fastened to the shaft 36, the central line of its peripheral surface being in vertical line with the axis of the shaft 3, and the various adjustments made to rotate the blank and the tool head at the proper ratio to generate a predetermined number of working elements on the periphery.

Figure 8:
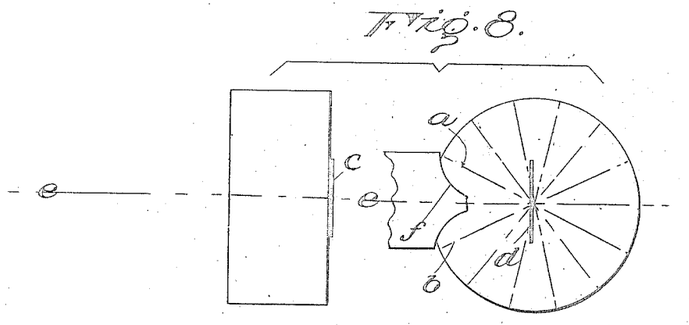
Figs. 8, 9 and 10 are diagrammatic views to illustrate the movement of the cutting tools and the blank when generating a working element.
Figure 9:
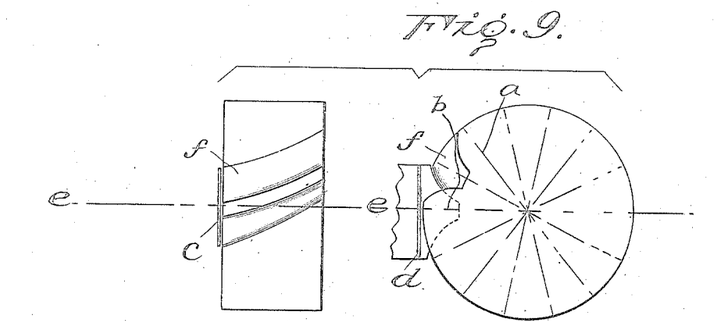
Figures 10, 11:
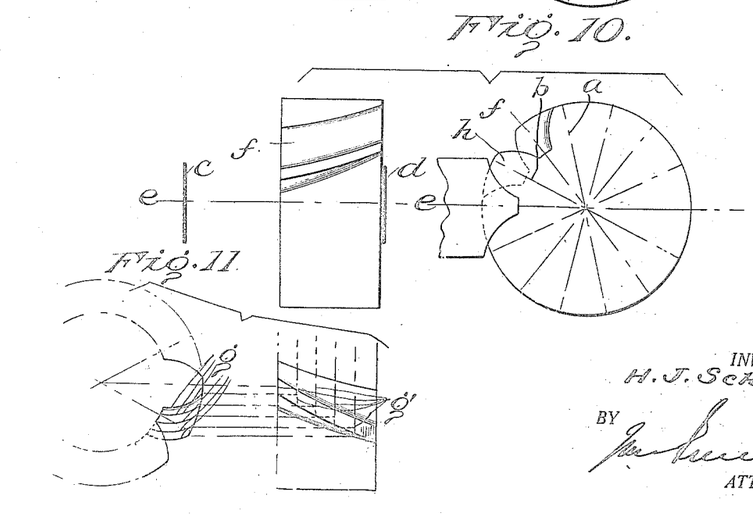
Fig. 11 is a diagrammatic illustration of one of the working elements generated by my improved machine.

To make the operation clear, reference is made specifically to Figs. 8 to 10, which diagrammatically illustrate the movement of the cutting tools and the blank. As shown, the diagrams illustrate a blank in which six helical working elements will be generated, and it will of course be understood that the tools cut but a fraction of the metal in their transit across the periphery of the blank, and that through the gearing shown, the blank is continuously advanced in the direction of the tools, so that in the successive movement of the tools the space between the elements is cut deeper, this operation continuing until the full depth of the space is obtained.

For convenience in understanding the motion of the tools with reference to the blank, the letters $a$ and $b$, in Figs. 8 and 10, represent the radial lines passing through the centers of two proposed helical elements, and two cutting tools are indicated at $c$ and $d$. As a further means of understanding the operation, it must be understood that the space between the cutters $c$—$d$, is twice the width of the periphery of the blank to produce the requisite movement when the cam elements are generated.

The cutting tools, as previously outlined travel in a straight line $e$, indicated in Figs. 8 and 10, which of course is at right angle to the motion of the blank at the generating point of contact.

When the cutting tool $c$, reaches the face of the blank as shown in Fig. 8, it starts to cut a space $f$, in the periphery, and as said tool travels in its straight line, and the blank rotates, the cut is of helical formation, and as the side edges of the tool are curved, the side walls of the cut are correspondingly curved, as shown by the lines $g$ which are cross sections on the dotted lines $g'$, in Fig. 11. By the time the cutting tool travels across the width of the periphery of the blank as indicated diagrammatically in Fig. 9, the blank has rotated circumferentially half the distance between the lines $a$—$b$ while the cutting tool $d$, is distanced from the opposite face of the blank, a distance equal to the width of the periphery of the blank, as shown in Fig. 9. While the next cutting tool $d$, is approaching the face of the blank, the latter rotates half the angular distance between the lines $a$—$b$ to form the body of a cam element $h$, shown in Fig. 10. When the blank and tool have thus moved, the cutting tool $d$ is in cutting position against the blank as shown in Fig. 10, and the tool $c$, at this time is of course moving away from the blank, as shown.

When the cutting tool $d$, travels across the periphery of the blank while the latter is rotated as described above, the action of each of the tools generates the curved sides of two elements, and the continued operation of the cutting tools on the blank generates similar helical elements entirely around the periphery of the blank.

It follows from the action of the parts as described that helical elements are generated by parts which move in right angular lines.

When the tools move through the horizontal guideway, they successively pass into the circular portion of the guideway to again be positioned for next cutting operation.

Figure 12:
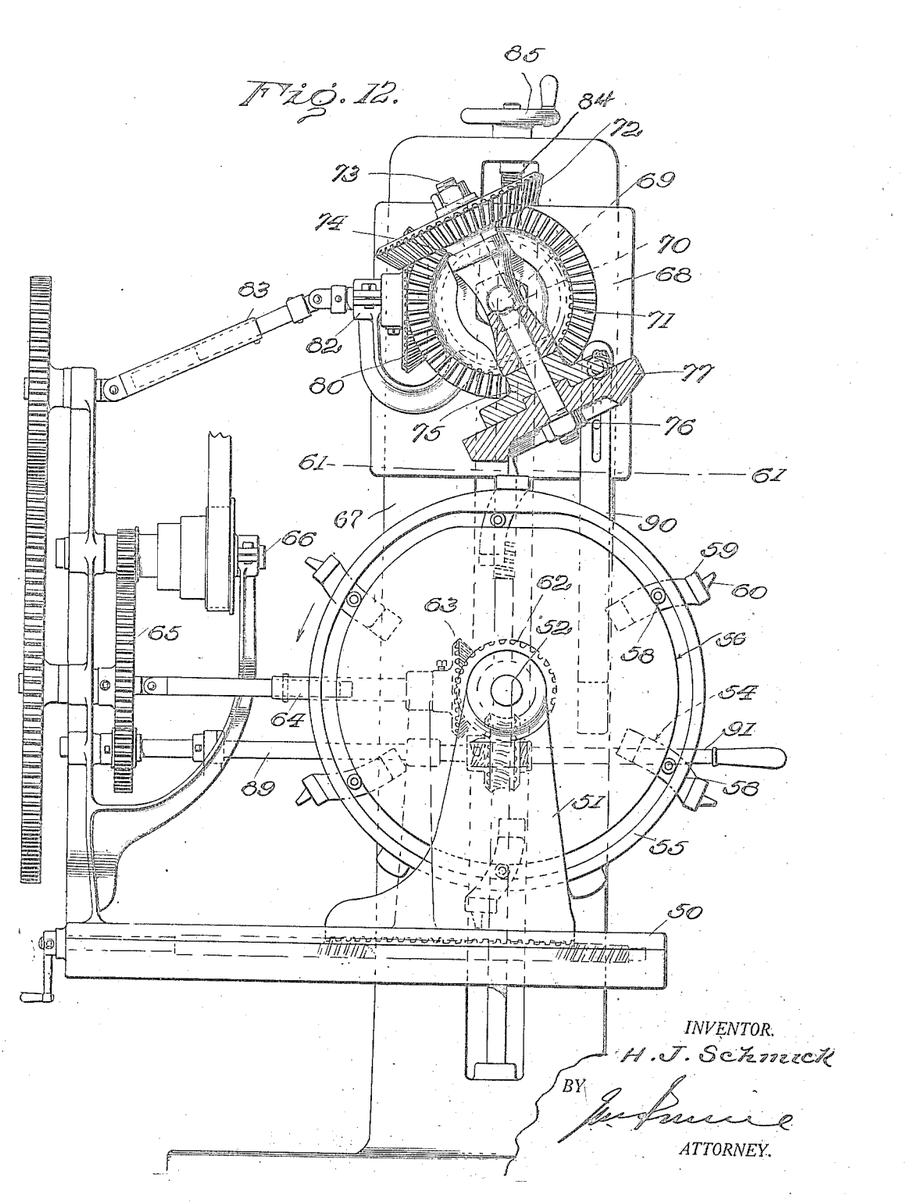
Fig. 12 is an end view of a different form of the invention.
Figure 13:
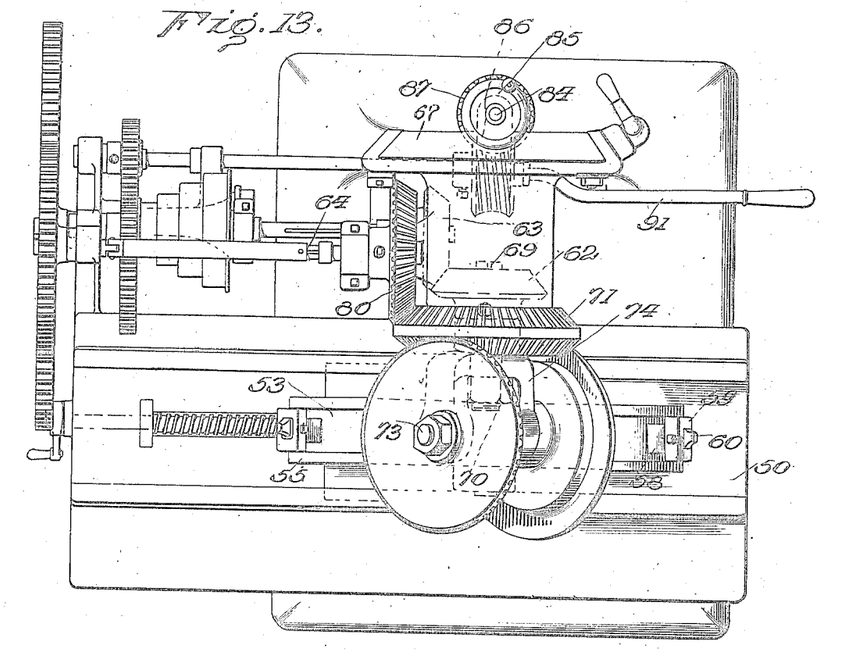
Fig. 13 is a plan view of the same.

In Figs. 12 and 13, I have shown the cutting tools projecting from the periphery of the tool head, and a simplified form of blank carrier. In these figures, 50 indicates the adjustable platform, and extending up therefrom is a standard 51, in which is mounted a shaft 52. Mounted on the shaft 52 is the tool head 53, provided with curved slots 54, the head rotating in a frame 55, in the front plate of which is a guideway 56, similar to the guideway 21, previously described. 58, indicates tool holders provided with curved stems to engage in the curved slots 54, and projecting therefrom are rollers 58, which travel in the guideway 56. At the outer ends of the tool holders are sockets 59, which receive cutting tools 60, which in their movement travel around with the tool head, but when the horizontal portion of the guideway is reached, the tools travel in a straight line indicated at 61—61, in Fig. 12. Due to the head rotating, the stems have an arcuate sliding motion in the slots when the horizontal portion of the guideway is reached. The result of this curved sliding movement and the rotary motion of the tool holders when traveling in the straight portion of the guideway, results in the tools following a straight line, the arc of the slots compensating for the arc produced by the rotary movement of the head. On the shaft 52, is a beveled gear wheel 62, and meshing therewith is a beveled gear wheel 63, mounted on a telescopic shaft 64. This shaft is rotatably connected by gears 65, with a power shaft 66, by which motion is imparted to the tool head.

A standard 67 is located in rear of the tool head, and mounted thereon is a slide 68, provided with a stub shaft 69 on which is mounted a double face beveled gear wheel 71, and meshing with one set of the teeth thereon is a beveled gear wheel 72, secured to a shaft 73 mounted in bearings in a frame 74, supported on the shaft 69, and held in adjusted position by the nut 70. On the opposite or lower end of the shaft 73, is a blank carrier 75, and secured to same by a clamp nut 76, is a beveled gear blank 77. It follows that by releasing the nut 70, the blank carrier may be angularly adjusted to properly adjust the periphery of the beveled gear blank with reference to the straight line movement of the cutters. The double face beveled gear wheel 71, rotates freely on the stub shaft 66, and meshing with the rear set of bevel teeth is a beveled gear wheel 80, mounted on a short shaft 81, supported in a bearing 82. The short shaft 81, is connected by a telescopic shaft 83, geared to the telescopic shaft 64.

In suitable bearings on the rear of the standard is a screw 84, provided with a hand wheel 85. The screw engages a threaded lug 86, projecting from the rear of the slide 68, and at its lower end it is provided with a worm gear wheel 87, which meshes with a worm gear wheel 88, mounted on a movable shaft 89, which is connected to the power driven gears 65 by means of a universal joint.

In the operation of this form of the invention, the tool head and the blank carrier are geared and timed to move with reference to each other in the same fashion as that previously described. As the tool head rotates, the cutting tools are carried around the axis of shaft 52, and when the rollers 58, reach the horizontal portion of the guideway, the tools are thereby caused to travel in a straight line, while the gear blank 77, is continuously rotated and the resulting cutting action produces on the periphery of the blank conical elements of the same physical characteristics as the elements previously described. During this operation, the worm gearing 87 and 88 rotates the screw 84, and the slide is gradually fed downward to receive the successive cuts of the tools 60.

To adjust the blank carrier to accommodate peripheries of different angles the nut 70, is released, and the frame 74, is rotated on its shaft, and the hand wheel 85, is turned to make the vertical adjustment, and the standard 51, is adjusted in its guides.

A hand lever 91 supports the movable end of the shaft 89 and permits disconnection of the gears 87 and 88, when operation by the hand wheel 85 is desired. These adjustments having been made the parts are tightened and the machine is ready for operation.

The invention is not restricted to external gears of the types shown, but may be applied to external and internal gear segments, cams and other mechanical devices having working surfaces capable of being generated by the methods or apparatus described.

What I claim is:—

1. The method of generating helical mechanical elements consisting in moving successively a plurality of cutting tools in a straight line entirely across the full width of the blank operated upon and continually rotating the blank, the movement of the blank during the cutting period equaling half the circumferential distance between the centers of the teeth.

2. The method of generating helical mechanical elements consisting in moving successively a plurality of cutting tools spaced apart twice the width of the blank in a straight line entirely across the full width of the blank operated upon, and continually rotating the blank, the movement of a blank while the tool is making a cut equaling half the circumferential distance between the centers of two adjacent teeth.

3. In a gear generating machine, the combination of a blank carrier, a tool head carrying a plurality of cutting tools which cut entirely across the width of a blank, means for causing the tools to travel in a straight line across the vertical plane of the center of the blank, and means for continually rotating the blank.

4. In a gear generating machine for cutting helical mechanical elements, the combination of a rotary tool head, a plurality of spaced cutting tools carried by the head, a blank carrier, means for continuously rotating the blank carrier, and means to cause the cutting tools to travel in a straight line across the width of the blank during the cutting operation.

5. In a gear generating machine for cutting mechanical elements, the combination of a blank carrier, means for continually rotating the blank carrier, a tool head, a plurality of spaced cutting tools mounted on the tool head, the distance between the tools being twice the width of the blank and means for causing the tools to travel in a straight line entirely across the width of the blank.

6. In a gear generating machine, the combination of a rotary cutter head, a plurality of tool holders slidably and individually rotatably mounted in the cutter head, a blank carrier, means for causing the tools to move in a straight line, and means for continuously rotating the blank carrier.

7. In a gear generating machine, for generating helical working elements, the combination of a rotary cutting head, a plurality of spaced tool holders rotatable with the head and movable for a predetermined distance in their travel in a straight line, a blank carrier, and means timed to move a blank on the carrier one half the distance between two adjacent elements, the space between the tools being such as to permit of the blank rotating the remaining distance between two elements before the succeeding cutter tool commences to perform its cutting operation on the blank.

8. In a gear generating machine, the combination of a cutter head formed with a plurality of slots, a tool holder support slidably mounted in each slot, a tool holder mounted in the support, means to cause the tool holders to rotate in their supports in part of their path of movement and to travel in a straight line, a blank carrier, and means to cause the blank carrier to continuously rotate, the straight line movement of the tool holders carrying the tools crosswise of the width of the rotating blank.

9. In a gear generating machine, the combination of a rotary cutter head, a plurality of tool holders movably mounted in the cutter head, means to cause the tools to travel in a straight line once during each revolution of the head, a blank carrier, and means for continuously rotating the blank carrier adjacent to the tools when moving in the straight line portion of their path to cause them to engage the periphery of the blank to cut helical elements thereon.

10. In a gear generating machine, the combination of a rotary cutter head provided with a plurality of tool holders, means for mounting the tool holders to have movement independent of the rotary motion, means to move the tool holders in a straight line during a portion of the revolution of the cutter head and to hold them against angular movement, a blank carrier, and means to continuously rotate the blank carrier to cause the cutting tools to cut while held against angular movement and while movable in a straight line.

11. In a gear generating machine for generating helical spaced elements, the combination of a cutter head, a plurality of tools carried by the cutter head, a blank carrier, and means to operate the blank carrier and the cutter head to cause a cutter to cut across the periphery while the blank rotates half the distance between two adjacent elements, the blank rotating the remaining half distance between said elements for the next succeeding cutter to cut a space in the blank.

12. In a gear generating machine for generating helical spaced elements, the combination of a rotary cutter head, a plurality of spaced independently movable tool holders mounted on the rotary cutter head, means to cause the tool holders while moving with the cutter head to travel in a straight line, a blank carrier, and gearing to continually rotate the blank carrier and the rotary cutter head, the movement of the blank carrier being timed to move one half the distance between adjacent elements, while one cutter cuts across the periphery of the blank and to move the remaining half distance between said elements before a succeeding cutter comes into cutting position.

13. In a gear generating machine, the combination of a cutter head, a guideway adjacent thereto having an annular portion and a horizontal portion, a plurality of tool holders mounted in the cutter head to have movement independent of each other, and adapted to travel in the guideway, a blank carrier, the axis of which is parallel with the horizontal portion of the guideway and adapted to carry a blank to present the periphery thereof in the path of the cutting tools while the latter move in the horizontal portion of the guideway, and means to continuously rotate the blank carrier.

14. In a gear generating machine, the combination of a rotary cutter head and a blank carrier, a plurality of tools carried by the rotary cutter head, means for causing the tools to travel in a straight line for a predetermined period during the revolution of the cutter head, a blank carrier the axis of which is parallel with the straight line movement of the cutting tool, and means to cause a cutting tool to make a cut across the periphery of a blank and emerge therefrom and the blank to move to position for another cut before a successive tool engages the blank to make another cut.

15. In a gear generating machine, the combination of a cutter head provided with a plurality of cutting tools which extend from the cutter head and which when in cutting position travel in a straight line, a blank carrier, the axis of which is parallel with the straight line movement of the cutting tools, means for automatically operating the blank carrier, and means to cause the tools to successively cut across the periphery of a blank and emerge therefrom and the blank to continue to move to position for a succeeding cut, whereby helical tooth elements are generated.

16. In a gear generating machine for generating mechanical elements, the combination of a plurality of spaced cutting tools, a blank carrier, and means for causing the tools to travel in a straight line to successively cut entirely across the width of a blank on the carrier, and means for moving the carrier while a tool is cutting and continue to move said carrier in the same direction while a succeeding tool is being moved up to generating position.

17. In a gear generating machine for generating helical mechanical elements, the combination of a continuously movable blank carrier, a continuously movable cutter head, a plurality of cutting tools carried thereby, and means for causing the cutting tools to travel in a straight line to cut successively on the continuously moving blank.

18. In a gear generating machine for generating helical mechanical elements, the combination of a continuously rotated blank carrier, a rotary cutter head provided with a plurality of spaced cutting tools, means for causing the tools to move in a straight line while cutting the blank, means for angularly adjusting the blank carrier, a double faced gear wheel around which the blank carrier is adjustable and which is geared to the blank carrier, and gearing for operating the double face beveled gear and the cutter head in synchronism.

19. In a gear cutting machine for generating mechanical elements, the combination of a continuously movable blank carrier, a continuously movable series of spaced cutting tools movable in a straight line transverse to the direction of motion of the blank operated upon.

20. In a gear generating machine for generating helical mechanical elements, the combination of a rotary blank carrier, a continuously rotated tool head, a plurality of cutting tools carried by the tool head, and means for moving the cutting tools in a straight line transverse to the direction of motion of the blank operated upon during the cutting operation.

21. In a machine for cutting mechanical elements, the combination of a rotatable cutter head provided with a plurality of cutting tools, a blank holder and means for rotating it in synchronism with said cutter head, and means for creating relative movement between the blank holder and the cutting tool whereby the tool action is in a straight line entirely across the surface acted on.

In testimony whereof I affix my signature.

HENRY J. SCHMICK.